US010864806B2

(12) United States Patent
Jeon et al.

(10) Patent No.: US 10,864,806 B2
(45) Date of Patent: Dec. 15, 2020

(54) DOOR FOR VEHICLE

(71) Applicants: Hyundai Motor Company, Seoul (KR); Kia Motors Corporation, Seoul (KR); Duckyang Ind. Co., Ltd., Ulsan (KR)

(72) Inventors: Dongmin Jeon, Suwon-Si (KR); Kwang Seub Kim, Suwon-si (KR)

(73) Assignees: Hyundai Motor Company, Seoul (KR); Kia Motors Corporation, Seoul (KR); Duckyang Ind. Co., Ltd., Ulsan (KR)

( * ) Notice: Subject to any disclaimer, the term of this patent is extended or adjusted under 35 U.S.C. 154(b) by 13 days.

(21) Appl. No.: 16/432,650

(22) Filed: Jun. 5, 2019

(65) Prior Publication Data

US 2020/0238799 A1   Jul. 30, 2020

(30) Foreign Application Priority Data

Jan. 24, 2019   (KR) ........................ 10-2019-0009280

(51) Int. Cl.
*B60J 5/04* (2006.01)

(52) U.S. Cl.
CPC .......... *B60J 5/0463* (2013.01); *B60J 5/0402* (2013.01); *B60J 5/0406* (2013.01); *B60J 5/048* (2013.01); *B60J 5/0416* (2013.01); *B60J 5/0443* (2013.01)

(58) Field of Classification Search
CPC ... B60J 5/042; B60J 5/04; B60J 5/0451; B60J 5/0425; B60J 5/0416; B60J 5/0455; B60J 5/0458
See application file for complete search history.

(56) References Cited

U.S. PATENT DOCUMENTS

| | | | | |
|---|---|---|---|---|
| 4,434,580 A | * | 3/1984 | Engelsberger | B60J 5/0412 296/146.6 |
| 5,001,867 A | * | 3/1991 | Dupuy | B60J 10/24 49/502 |
| 5,325,632 A | * | 7/1994 | Djavairian | B60J 5/0425 296/146.6 |
| 5,398,453 A | * | 3/1995 | Heim | B60J 5/042 49/502 |
| 6,205,714 B1 | * | 3/2001 | Staser | B60J 5/0416 296/146.6 |
| 6,328,359 B1 | * | 12/2001 | Pacella | B60J 5/0425 293/128 |
| 6,332,641 B1 | * | 12/2001 | Okana | B60J 5/0425 296/146.6 |
| 6,382,707 B1 | * | 5/2002 | Dunneback | B60J 5/0425 296/146.6 |
| 6,640,500 B1 | * | 11/2003 | Stout | B60J 5/0416 296/146.7 |
| 6,672,648 B2 | * | 1/2004 | Heranney | B60J 5/0451 296/146.6 |

(Continued)

*Primary Examiner* — Gisele D Ford
(74) *Attorney, Agent, or Firm* — Morgan, Lewis & Bockius LLP

(57) ABSTRACT

A door of a vehicle may include a first door module forming a door skeleton; and a second door module coupled with the first door module and forming a door window; and where the second door module is made of a relatively lightweight material as compared to the first door module and a reinforcement member is coupled along external edge portions of the first door module and the second door module, reducing weight and cost of the door of the vehicle.

13 Claims, 5 Drawing Sheets

(56) References Cited

U.S. PATENT DOCUMENTS

| | | | | |
|---|---|---|---|---|
| 6,732,474 B1* | 5/2004 | Eck | B60J 5/0416 | 49/502 |
| 7,857,375 B2* | 12/2010 | Huttsell | B60R 21/0428 | 296/146.6 |
| 9,592,721 B1* | 3/2017 | Kelly | B60J 5/0425 | |
| 10,214,082 B2* | 2/2019 | Nagaishi | B60J 5/0427 | |
| 2001/0017476 A1* | 8/2001 | Nishikawa | B60J 5/0451 | 296/146.6 |
| 2002/0095870 A1* | 7/2002 | Praud | B60J 5/0416 | 49/502 |
| 2002/0180236 A1* | 12/2002 | Blomeling | B60R 13/02 | 296/146.5 |
| 2003/0140566 A1* | 7/2003 | Sommer | B60J 5/0408 | 49/502 |
| 2003/0188492 A1* | 10/2003 | Bonnett | B60J 5/0483 | 49/502 |
| 2004/0026957 A1* | 2/2004 | Bodin | B60J 5/0465 | 296/146.6 |
| 2004/0080179 A1* | 4/2004 | Okazaki | B60J 5/043 | 296/146.6 |
| 2004/0119318 A1* | 6/2004 | Moriyama | B60J 5/0429 | 296/146.6 |
| 2005/0206191 A1* | 9/2005 | Bodin | B60J 5/0455 | 296/146.6 |
| 2005/0264028 A1* | 12/2005 | Bodin | B60J 5/0425 | 296/146.6 |
| 2006/0290166 A1* | 12/2006 | Gehringhoff | B60J 5/0429 | 296/146.6 |
| 2007/0039245 A1* | 2/2007 | Buchta | E05F 11/382 | 49/502 |
| 2007/0090666 A1* | 4/2007 | Brennecke | B60J 5/0451 | 296/146.6 |
| 2007/0102955 A1* | 5/2007 | Bodin | B60J 5/0425 | 296/146.6 |
| 2007/0145770 A1* | 6/2007 | Katou | B60J 5/0429 | 296/146.6 |
| 2008/0222962 A1* | 9/2008 | Staser | E05F 11/488 | 49/502 |
| 2009/0236871 A1* | 9/2009 | Shibasaki | B60J 5/0455 | 296/146.6 |
| 2011/0037288 A1* | 2/2011 | Yoshioka | B60J 5/0429 | 296/146.6 |
| 2011/0101733 A1* | 5/2011 | Anderson | B60J 5/06 | 296/187.12 |
| 2011/0113697 A1* | 5/2011 | Sachdev | B60J 5/0436 | 49/502 |
| 2011/0169302 A1* | 7/2011 | Deng | B60J 5/042 | 296/187.12 |
| 2011/0204679 A1* | 8/2011 | Deng | B60J 5/0461 | 296/187.12 |
| 2011/0221229 A1* | 9/2011 | Rouhana | B60J 5/042 | 296/146.6 |
| 2011/0278880 A1* | 11/2011 | Tsuyuzaki | B62D 25/087 | 296/187.11 |
| 2012/0007386 A1* | 1/2012 | Kriese | B60J 5/0416 | 296/146.5 |
| 2012/0036780 A1* | 2/2012 | Pleiss | B60J 5/0416 | 49/70 |
| 2013/0049397 A1* | 2/2013 | Cohoon | B60J 5/0437 | 296/146.6 |
| 2013/0057018 A1* | 3/2013 | Reese | B60J 5/042 | 296/146.6 |
| 2013/0074413 A1* | 3/2013 | Moriya | B60J 5/0433 | 49/394 |
| 2013/0168996 A1* | 7/2013 | Svedberg | B60J 5/0433 | 296/146.6 |
| 2013/0199098 A1* | 8/2013 | Kriese | E06B 3/44 | 49/417 |
| 2013/0341961 A1* | 12/2013 | Mori | B60R 13/04 | 296/146.2 |
| 2014/0246879 A1* | 9/2014 | Ishigame | B60J 5/0437 | 296/146.6 |
| 2014/0367947 A1* | 12/2014 | Torii | B60J 5/0461 | 280/730.2 |
| 2015/0151616 A1* | 6/2015 | Makowski | B60J 5/0456 | 296/146.6 |
| 2015/0352930 A1* | 12/2015 | Belpaire | B62D 29/002 | 428/34.1 |
| 2015/0352932 A1* | 12/2015 | Mildner | B60J 5/0429 | 296/193.05 |
| 2016/0229269 A1* | 8/2016 | Kawabe | B60J 5/0402 | |
| 2016/0280048 A1* | 9/2016 | Friedman | B60J 5/0468 | |
| 2016/0303952 A1* | 10/2016 | Hoff | B60J 5/0443 | |
| 2016/0362923 A1* | 12/2016 | Choi | E05D 15/1081 | |
| 2017/0036521 A1* | 2/2017 | Ogawa | B62D 29/04 | |
| 2017/0136856 A1* | 5/2017 | Sugie | B60J 5/0493 | |
| 2017/0240029 A1* | 8/2017 | Moriyama | B60J 5/0433 | |
| 2017/0274744 A1* | 9/2017 | Hirakawa | B60J 5/0447 | |
| 2017/0274838 A1* | 9/2017 | Kim | B29C 45/14786 | |
| 2017/0313165 A1* | 11/2017 | Fortin | B60J 5/0416 | |
| 2017/0314306 A1* | 11/2017 | Fortin | B60J 5/0416 | |
| 2017/0326954 A1* | 11/2017 | Peidro Aparici | B60J 5/0427 | |
| 2018/0029646 A1* | 2/2018 | Kanagai | B60J 5/06 | |
| 2018/0134129 A1* | 5/2018 | Choi | B60J 5/0437 | |
| 2018/0141415 A1* | 5/2018 | Baccouche | B29D 99/0003 | |
| 2018/0170156 A1* | 6/2018 | Kwak | B60J 5/0443 | |
| 2018/0208029 A1* | 7/2018 | Tanaka | B60J 5/0437 | |
| 2018/0222295 A1* | 8/2018 | Schlachter | B60R 13/0815 | |
| 2019/0084386 A1* | 3/2019 | Tanaka | B60J 5/0443 | |
| 2020/0130482 A1* | 4/2020 | Benson | B60J 5/0458 | |

* cited by examiner

DOOR FOR VEHICLE

CROSS-REFERENCE TO RELATED APPLICATION

The present application claims priority to Korean Patent Application No. 10-2019-0009280 filed on Jan. 24, 2019, the entire contents of which is incorporated herein for all purposes by this reference.

BACKGROUND OF THE INVENTION

Field of the Invention

The present invention relates to a door of a vehicle. More particularly, the present invention relates to a door of a vehicle capable of reducing weight and cost and improving assembling workability.

Description of Related Art

Generally, a vehicle door is provided with a door window to improve the ventilation of the internal to the vehicle, the visibility and the habitability of the passenger, and is usually made of a steel material in consideration of collision stability and the like.

That is, the door external panel and the door internal panel of the steel material form a door skeleton, and a door frame is formed at the upper portion of the panels to form a door window. A door module provided with a regulator for raising and lowering the door window glass is built in the internal space formed by the combination of the door external panel and the door internal panel.

Furthermore, the door internal panel is combined with a door trim as an internal material provided with a door switch or window switch, and an impact beam is disposed close to the door external panel to increase the side impact rigidity of the door.

However, in the conventional door structure as described above, since the door internal panel and the door frame are usually made of steel, the weight of the door is increased. Since the door internal panel and the door module are separately manufactured so that the number of parts of the door is increased, it is necessary to develop a more innovative vehicle door by reducing and reducing the weight of the material.

The information included in this Background of the Invention section is only for enhancement of understanding of the general background of the invention and may not be taken as an acknowledgement or any form of suggestion that this information forms the prior art already known to a person skilled in the art.

BRIEF SUMMARY

Various aspects of the present invention are directed to providing a door of a vehicle configured for reducing the number of parts of the door by modularizing a large number of parts forming the door, reducing the weight by making a portion of the door module made of a relatively lightweight material instead of a steel material, reducing assembly man hour and cost, and increasing stiffness of the door of the vehicle.

A door of a vehicle according to an exemplary embodiment of the present invention may include a first door module forming a door skeleton; and a second door module coupled with the first door module and forming a door window; and where the second door module is made of a relatively lightweight material as compared to the first door module and a reinforcement member is coupled along external edge portions of the first door module and the second door module.

The first door module may be formed of metal material; and the second door module may be formed of plastic material.

A door trim may be coupled with the second door module.

The first door module may include a door external panel disposed toward the outside of a passenger compartment; a door internal panel disposed toward the internal to the passenger compartment; a door frame bonded to an upper portion of the door internal panel; and an impact beam bonded to the door internal panel.

The door internal panel may be provided with an opening portion at a center thereof.

A reinforcing beam may be integrally coupled with the door internal panel to cross a part of the opening portion of the door internal panel.

The door frame may include two pillar portions extending in a height direction of the vehicle at a front side and a rear side along a longitudinal direction of the vehicle.

The reinforcement member may form a closed loop.

The reinforcement member may have a pipe shape.

The reinforcement member may be formed of steel material having a rigidity higher than a rigidity of the second door module.

A rigid protruding portion formed protrudingly toward the passenger compartment may be provided at the door internal panel; and the reinforcement member may be fastened to the rigid protruding portion.

A nut may be bonded to the reinforcement member via welding; and a bolt may penetrate the rigid protruding portion to be fastened to the nut.

At least two surfaces of the reinforcement member may be fastened to the rigid protruding portion in close contact with each other.

A receiving groove may be formed at an external edge portion of the second door module; and the reinforcement member may be inserted into the receiving groove and bonded thereto via an adhesive.

The door for a vehicle according to an exemplary embodiment of the present invention may include the first door module made of metal material, the second door module made of lightweight material compared to steel, and a door trim, reducing the number of portions and weight and cost of the door of a vehicle.

Furthermore, since only three door modules need to be mounted to each other, it is possible to reduce assemble man hour, improve assemble workability, and appropriately increase stiffness of the door of the vehicle through the reinforcement member coupled along an external edge portion of the door.

The methods and apparatuses of the present invention have other features and advantages which will be apparent from or are set forth in more detail in the accompanying drawings, which are incorporated herein, and the following Detailed Description, which together serve to explain certain principles of the present invention.

Figure 1:
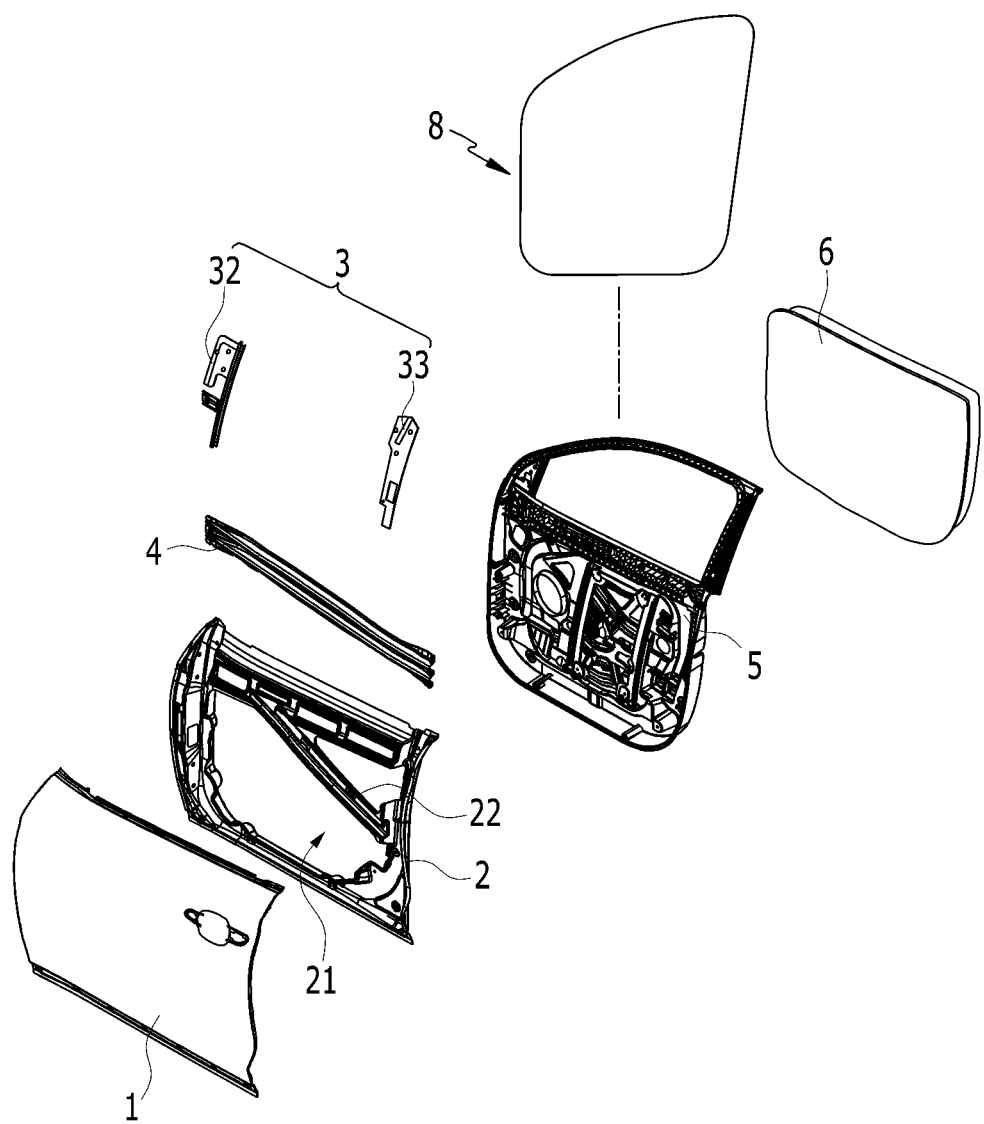
FIG. 1 is an exploded perspective view of a door of a vehicle according to an exemplary embodiment of the present invention.

It may be understood that the appended drawings are not necessarily to scale, presenting a somewhat simplified representation of various features illustrative of the basic principles of the present invention. The specific design features of the present invention as included herein, including, for example, specific dimensions, orientations, locations, and shapes will be determined in part by the particularly intended application and use environment.

In the figures, reference numbers refer to the same or equivalent parts of the present invention throughout the several figures of the drawing.

DETAILED DESCRIPTION

Reference will now be made in detail to various embodiments of the present invention(s), examples of which are illustrated in the accompanying drawings and described below. While the present invention(s) will be described in conjunction with exemplary embodiments of the present invention, it will be understood that the present description is not intended to limit the present invention(s) to those exemplary embodiments. On the other hand, the present invention(s) is/are intended to cover not only the exemplary embodiments of the present invention, but also various alternatives, modifications, equivalents and other embodiments, which may be included within the spirit and scope of the present invention as defined by the appended claims.

Exemplary embodiments of the present application will be described more fully hereinafter with reference to the accompanying drawings, in which exemplary embodiments of the present invention are shown. As those skilled in the art would realize, the described embodiments may be modified in various different ways, all without departing from the spirit or scope of the present invention.

The drawings and description are to be regarded as illustrative in nature and not restrictive. Like reference numerals designate like elements throughout the specification.

Since size and thickness of each component illustrated in the drawings are arbitrarily represented for convenience in explanation, the present invention is not limited to the illustrated size and thickness of each component and the thickness is enlarged and illustrated to clearly express various portions and areas.

In the following description, dividing names of components into first, second and the like is to divide the names because the names of the components are the same as each other and an order thereof is not particularly limited.

Throughout the specification, unless explicitly described to the contrary, the word "comprise" and variations such as "comprises" or "comprising", will be understood to imply the inclusion of stated elements but not the exclusion of any other elements.

Figure 2:
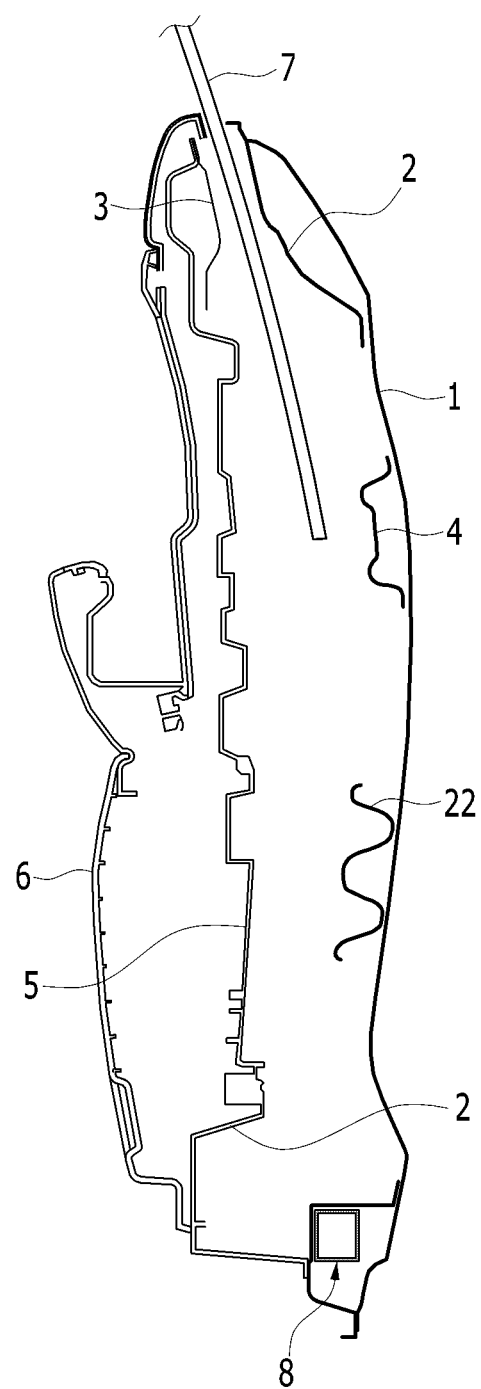
FIG. 2 is a cross-sectional view taken along line A-A of FIG. 1.

Referring to FIG. 1 and FIG. 2, a door of a vehicle according to an exemplary embodiment of the present invention may include a first door module having a door external panel 1, a door internal panel 2, a door frame 3 and an impact beam 4, a second door module 5, a door trim 6 as a third door module and a reinforcement member 8.

The door external panel 1 may be disposed outside a passenger compartment and formed of a perfect panel shape in consideration of door rigidity and external appearance. The door internal panel 2 may be disposed inside the passenger compartment and have an opening portion 21 at a center portion thereof to reduce weight and cost.

The door external panel 1 and the door internal panel 2 may be formed of metal material as steel.

A reinforcing beam 22 may be coupled to the door internal panel 2 in a form that transverse a portion of the opening portion 21.

When the door internal panel 2 is coupled with the door external panel 1, the reinforcing beam 22 may be disposed close to the door external panel 1 to support the door external panel 1.

The door frame 3 may be boned to an upper portion of the door internal panel 2.

The door frame 3 may include two pillar portions 32 and 33, which extend in a height direction of the vehicle and are disposed forwards and rearwards thereof along a longitudinal direction of the vehicle, respectively, to couple to the door internal panel 2.

That is, the conventional door frame has a roof portion corresponding to the roof profile of the vehicle body and a center pillar portion corresponding to the center pillar profile of the vehicle body when the door is closed, while the door frame 3 according to an exemplary embodiment of the present invention removes the conventional roof portion and the center pillar portion.

Therefore, the door frame 3 according to an exemplary embodiment of the present invention may reduce weight and cost as compared to the conventional door frame.

The impact beam 4 may be joined to the door internal panel 2 and disposed close to the door external panel 1, absorbing the impact at the side collision and blocking the intrusion of the door into the passenger compartment.

The impact beam 4 and the door frame 3 are joined to the door internal panel 2 and the door internal panel 2 is bonded to the door external panel 1 so that the first door module as a door skeleton may be formed.

The second door module 5 may be made of a relatively lightweight material, for example, plastic material, as compared to the first door module.

The reinforcement member 8 may be disposed between the first door module and the second door module 5 to increase door rigidity.

The reinforcement member 8 may be formed of a material having a higher rigidity than the second door module 5, for example, steel material.

The reinforcement member 8 may be formed as a shape corresponding to the profile of the external edge portion of the door, may form a closed loop, and may preferably be formed as a pipe shape.

When the second door module 5 is coupled with the first door module, an internal space is formed therebetween. A door glass 7 for opening and closing the door window may be inserted into the internal space to be vertically movable via a lifting device such as regulator.

Figure 3:
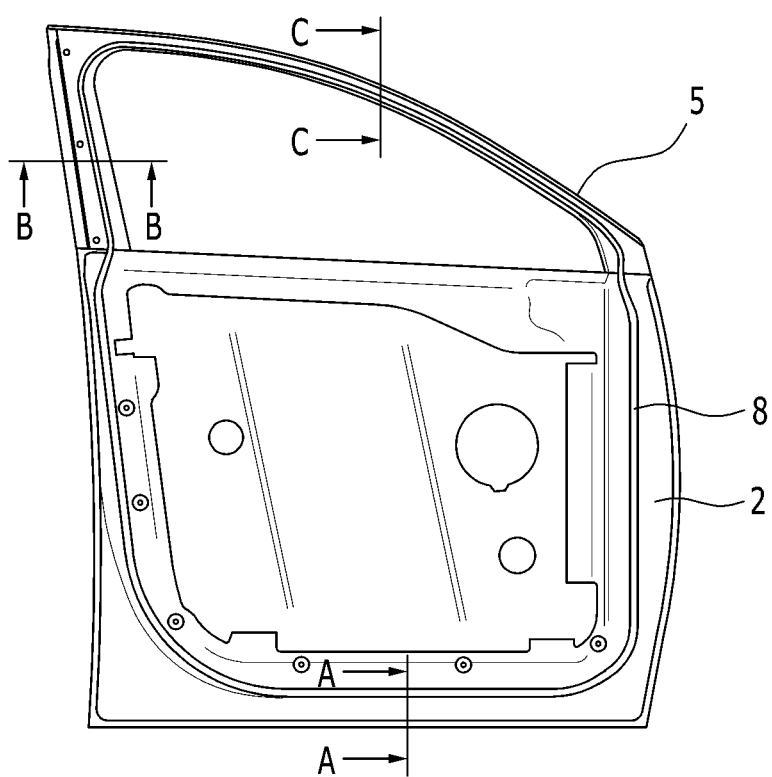
FIG. 3 is a front view of a door of a vehicle to which a reinforcement member according to the exemplary embodiment of the present invention is coupled.
Figure 4A:
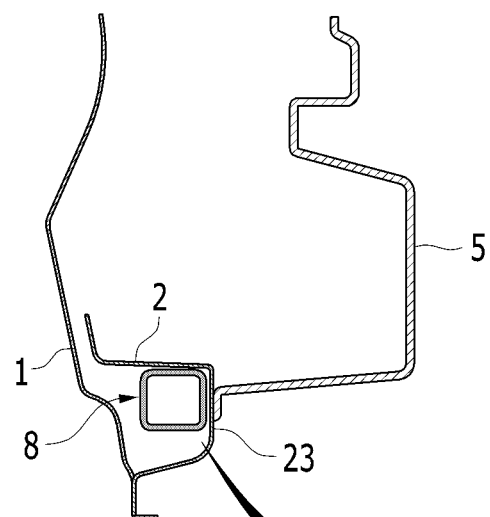
FIG. 4A and FIG. 4B are cross-sectional views taken along line A-A of FIG. 3.
Figure 4B:
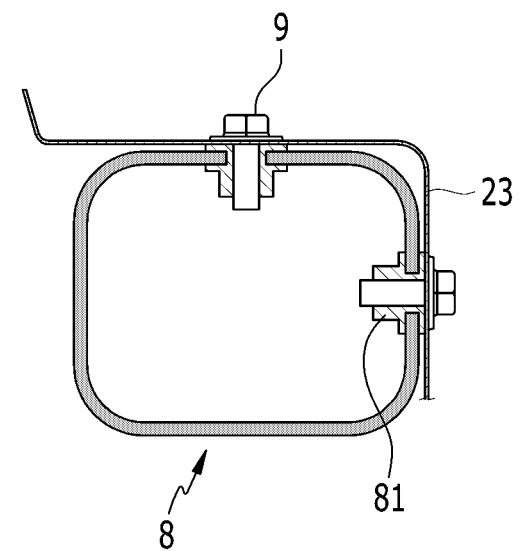

Referring to FIG. 3 and FIG. 4A AND FIG. 4B, the reinforcement member 8 may be fastened to the door internal panel 2.

A rigid protruding portion 23 for increasing the rigidity of the door internal panel 2 may be integrally formed with the door internal panel 2 by protruding to the internal to the passenger compartment and a space of a predetermined size may be formed between the rigid protruding portion 23 and the door external panel 1 so that the reinforcement member 8 may be inserted into the space.

The reinforcement member 8 may be fastened with bolts 9 in close contact with two or more surfaces of the door internal panel 2.

For bolt 9 fastening, the reinforcement member 8 may be welded in advance with a nut 81.

Figure 5:
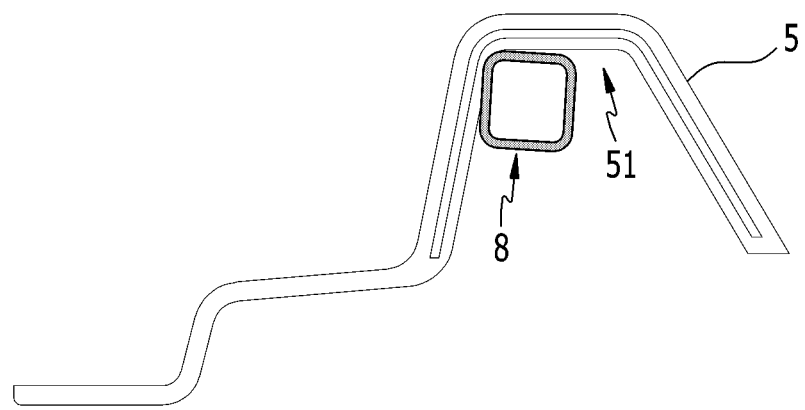
FIG. 5 is a cross-sectional view taken along line B-B of FIG. 3.
Figure 6:
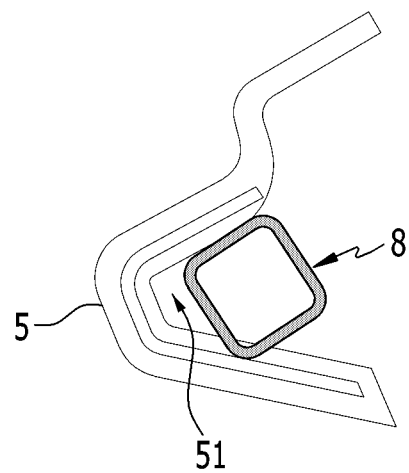
FIG. 6 is a cross-sectional view taken along line C-C of FIG. 3.

Referring to FIG. 5 and FIG. 6, a receiving groove 51 may be formed at the edge portion of the second door module 5 so that the reinforcement member 8 may be inserted into the receiving groove 51 to be stably supported. The reinforcement member 8 may be inserted into the receiving groove 51 and bonded to the second door module 5 with an adhesive and the like.

For convenience in explanation and accurate definition in the appended claims, the terms "upper", "lower", "inner", "outer", "up", "down", "upper", "lower", "upwards", "downwards", "front", "rear", "back", "inside", "outside", "inwardly", "outwardly", "internal", "external", "inner", "outer", "forwards", and "backwards" are used to describe features of the exemplary embodiments with reference to the positions of such features as displayed in the figures. It will be further understood that the term "connect" or its derivatives refer both to direct and indirect connection.

The foregoing descriptions of specific exemplary embodiments of the present invention have been presented for purposes of illustration and description. They are not intended to be exhaustive or to limit the present invention to the precise forms disclosed, and obviously many modifications and variations are possible in light of the above teachings. The exemplary embodiments were chosen and described to explain certain principles of the present invention and their practical application, to enable others skilled in the art to make and utilize various exemplary embodiments of the present invention, as well as various alternatives and modifications thereof. It is intended that the scope of the present invention be defined by the Claims appended hereto and their equivalents.

What is claimed is:

1. A door of a vehicle, the door comprising:
a first door module forming a door skeleton; and
a second door module coupled with the first door module and forming a door window,
wherein the second door module is made of a relatively lightweight material as compared to the first door module,
wherein a reinforcement member is coupled along external edge portions of the first door module and the second door module,
wherein the first door module includes:
a door external panel disposed toward an outside of a passenger compartment;
a door internal panel disposed toward an internal to the passenger compartment;
a door frame connected to an upper portion of the door internal panel; and
an impact beam connected to the door internal panel, and
wherein the door frame includes two pillar portions extending in a height direction of the vehicle at a front side and a rear side of the vehicle along a longitudinal direction of the vehicle.

2. The door of the vehicle of claim 1,
wherein the first door module is formed of metal material, and
wherein the second door module is formed of plastic material.

3. The door of the vehicle of claim 1,
wherein a door trim is coupled with the second door module.

4. The door of the vehicle of claim 1,
wherein the door internal panel is provided with an opening portion at a center thereof.

5. The door of the vehicle of claim 4,
wherein a reinforcing beam is integrally coupled with the door internal panel to cross a part of the opening portion of the door internal panel.

6. The door of the vehicle of claim 1,
wherein the reinforcement member forms a closed loop.

7. The door of the vehicle of claim 1,
wherein the reinforcement member has a pipe shape.

8. The door of the vehicle of claim 1,
wherein the reinforcement member is formed of steel material having a rigidity higher than a rigidity of the second door module.

9. The door of the vehicle of claim 1,
Wherein the door internal panel includes a protruding portion which is formed to protrude from a portion of the door internal panel toward the passenger compartment to form a predetermined space, and
wherein the reinforcement member is fastened to the protruding portion in the determined space of the protruding portion.

10. The door of the vehicle of claim 9,
wherein an end of the protruding portion and an end of the door external panel are connected to form the predetermined space therebetween, and
wherein the reinforcement member is positioned in the predetermined space.

11. The door of the vehicle of claim 9,
wherein a nut is connected to the reinforcement member via welding, and
wherein a bolt is configured to penetrate the protruding portion to be fastened to the nut.

12. The door of the vehicle of claim 9,
wherein at least two surfaces of the reinforcement member are fastened to the protruding portion in contact with each other.

13. The door of the vehicle of claim 1,
wherein a receiving groove is formed at an external edge portion of the second door module, and
wherein the reinforcement member is inserted into the receiving groove and connected thereto via an adhesive.

* * * * *